United States Patent
Rusakov et al.

(10) Patent No.: US 12,494,103 B2
(45) Date of Patent: Dec. 9, 2025

(54) BANKNOTE HANDLING MACHINE

(71) Applicants: SUZOHAPP Canada ULC, Woodbridge (CA); Scan Coin AB, Malmo (SE)

(72) Inventors: Yuriy Rusakov, Newmarket (CA); Andriy Kyselov, Ontario (CA); Anton Sotnikov, Richmond Hill (CA); Pavel Rabinovich, Richmond Hill (CA)

(73) Assignees: SUZOHAPP Canada ULC, Woodbridge (CA); Scan Coin AB, Malmo (SE)

( * ) Notice: Subject to any disclaimer, the term of this patent is extended or adjusted under 35 U.S.C. 154(b) by 0 days.

(21) Appl. No.: 18/676,450

(22) Filed: May 28, 2024

(65) Prior Publication Data

US 2024/0312283 A1  Sep. 19, 2024

Related U.S. Application Data

(63) Continuation of application No. 17/265,504, filed as application No. PCT/SE2019/050724 on Aug. 2, 2019, now Pat. No. 12,062,259.

(30) Foreign Application Priority Data

Aug. 3, 2018 (SE) .................................. 1850955-4

(51) Int. Cl.
  *G07D 11/18* (2019.01)
  *G07D 11/14* (2019.01)
  (Continued)

(52) U.S. Cl.
  CPC ............ *G07D 11/18* (2019.01); *G07D 11/14* (2019.01); *G07D 11/50* (2019.01); *G07D 7/12* (2013.01);
  (Continued)

(58) Field of Classification Search
  CPC .... B65H 2301/4473; B65H 2404/2693; B65H 2404/63; B65H 2301/4482; G07D 11/18
  See application file for complete search history.

(56) References Cited

U.S. PATENT DOCUMENTS 5,067,701 A    11/1991  Dekker
8,893,959 B1 * 11/2014  Graef ..................... G07D 11/24
                                                              235/379

(Continued)

FOREIGN PATENT DOCUMENTS

DE    10012367 A1    9/2001
EP    1 864 925 A2   12/2007
(Continued)

OTHER PUBLICATIONS

International Search Report and Written Opinion mailed Sep. 26, 2019, in connection with International Application No. PCT/SE2019/050724.

*Primary Examiner* — Howard J Sanders
(74) *Attorney, Agent, or Firm* — Wolf, Greenfield & Sacks, P.C.

(57) ABSTRACT

The disclosure relates to a banknote handling machine comprising: a banknote transport arrangement configured to transport banknotes along transport paths within the machine, wherein the banknote transport arrangement comprises a diverter assembly comprising: a diverter rotatably attached to a structure of the machine, and an electric motor configured to transfer kinetic energy to the diverter so as to rotate the diverter between a first position and a second position, wherein the diverter, when in the first position, is configured to control banknotes to be transported along a first transport path, and wherein the diverter, when in the second position, is configured to control banknotes to be transported along a second transport path.

9 Claims, 3 Drawing Sheets

(51) Int. Cl.
  *G07D 11/50*   (2019.01)
  *G07D 7/12*    (2016.01)
  *G07D 11/13*   (2019.01)
  *G07D 11/40*   (2019.01)

(52) U.S. Cl.
  CPC .............. *G07D 11/13* (2019.01); *G07D 11/40* (2019.01); *G07D 2207/00* (2013.01); *G07D 2211/00* (2013.01)

(56) References Cited

U.S. PATENT DOCUMENTS

| | | |
|---|---|---|
| 9,309,083 B1 | 4/2016 | Peterek |
| 11,498,792 B2 * | 11/2022 | Cuennet .............. B65H 29/585 |
| 12,062,259 B2 | 8/2024 | Rusakov et al. |
| 2010/0194033 A1 | 8/2010 | Berendes |
| 2015/0194004 A1 | 7/2015 | Sackfield |
| 2016/0335830 A1 | 11/2016 | Wakabayashi et al. |

FOREIGN PATENT DOCUMENTS

| | | |
|---|---|---|
| EP | 2 155 594 A1 | 2/2010 |
| EP | 2 277 813 A1 | 1/2011 |
| EP | 3 330 206 A1 | 6/2018 |
| FR | 2470747 A1 | 6/1981 |
| JP | 59004564 A1 | 1/1984 |
| WO | WO 2005/085109 A1 | 9/2005 |
| WO | WO 2008/138368 A1 | 11/2008 |

* cited by examiner

BANKNOTE HANDLING MACHINE

RELATED APPLICATIONS

The present application claims the benefit under 35 U.S.C. § 120 as a continuation application of U.S. application Ser. No. 17/265,504, filed on Feb. 2, 2021, which claims the benefit under U.S.C. § 371 as a U.S. National Stage Entry of International Application No. PCT/SE2019/050724, filed Aug. 2, 2019, which claims priority to Swedish Application No. 1850955-4, filed Aug. 3, 2018. The contents of these applications are incorporated herein by reference in their entirety.

FIELD OF THE INVENTION

The present invention relates to a banknote handling machine. More specifically, the disclosure relates to a banknote handling machine comprising a diverter.

BACKGROUND ART

Banknote handling machines are typically used for handling banknotes for cash transactions at a bank or other establishment handling relatively large amounts of cash. One kind of banknote handling machine is used at point of sale (POS), and are especially designed and constructed to be used for said cash transactions during a sale. Typically, banknote handling machines are configured to receive, and deposit, banknotes. Furthermore, the banknote handling machine may be configured to store banknotes, to check the validity of banknotes, etc.

There may thus be a need for relatively complex internal transport systems within the machine to accomplish the afore-mentioned tasks. Transport systems of banknote handling machines typically comprises a plurality of conveyors arranged such that at least two conveyor belts of the plurality of conveyors clamp each transported banknote to transport them in the direction of the conveyor belts. The plurality of conveyor belts may, if designed in an appropriate way, be configured to transport banknotes along several transport paths within the machine. Such transport parts may have junctions, i.e. locations where two or more paths meet. At such locations, diverters may be disposed.

Diverters typically comprise a movable structure configured to guide the banknote impinging on a surface thereof to a correct direction. Moving the diverter thus allows for diverting the banknotes to more than one location. Thus, the diverter may be used to define different transport paths within the machine.

Current banknote handling machines suffer from some disadvantages with respect to diverter solutions. For example, current diverters may usually not be positioned in more than two positions, they are expensive and often require complex auxiliary systems for being operated. There is thus a need for an improved banknote handling machine.

SUMMARY

It is an object to mitigate, alleviate or eliminate one or more of the above-identified deficiencies in the art and disadvantages singly or in any combination.

These and other objects of the invention are at least partly met by the invention as defined in the independent claims. Preferred embodiments are set out in the dependent claims.

According to a first aspect there is provided a banknote handling machine comprising:

a banknote transport arrangement configured to transport banknotes along transport paths within the machine, wherein the banknote transport arrangement comprises a diverter assembly comprising:
a diverter rotatably attached to a structure of the machine, and
an electric motor configured to transfer kinetic energy to the diverter so as to rotate the diverter between a first position and a second position,
wherein the diverter, when in the first position, is configured to control banknotes to be transported along a first transport path, and
wherein the diverter, when in the second position, is configured to control banknotes to be transported along a second transport path.

The banknote handling machine may be advantageous as it allows for an overall improved internal banknote transport mechanism. The use of an electric motor allows for reducing the implementation costs. Prior art diverters based on simple solenoids require cooling and voltage switching which increases costs of the overall system. Another advantage of the motorized diverter may be an increased extensibility. Instead of providing a mere two stable positions, as for solenoid-operated diverters, motorized diverters may provide more than two stable positions. Also, the exact positions may be adjusted in an easy way without having to rely on mechanical adjustments of the system. For example, a motorized diverter may be controlled by reprogramming a control unit configured to control the diverter. Another advantage may be increased switching speeds.

The diverter is used to divert banknotes along the first and second transport paths, respectively. However, the diverter may be further configured to control movement of banknotes along further transport paths. According to some embodiments, the diverter, when in the first position, is further configured to control banknotes to be transported along a third transport path.

The first and second transport paths may share a common portion. This implies that the first and second transport path could be seen as one transport path that is divided, by the diverter, into two transport paths. Likewise, the second and third transport paths may share a common portion. According to some embodiments, each of the first, second and third transport paths each share a common portion with one from the remaining transport paths. This implies that the first, second and third transport paths together define a three-way junction. Each transport path may define transport of banknotes in two opposite directions. Thus, the three-way junction allows for six separate banknote transport directions along two directions of three transport paths.

According to some embodiments, the diverter extends from a proximal end to a distal end, the diverter being rotatably attached to the supporting structure at said proximal end. This implies that the diverter is an elongated structure. It further implies that the distal end moves to a higher degree than the proximal end.

According to some embodiments, the diverter is rotatably attached to said structure via a rotational shaft.

According to some embodiments, the electric motor transfers the kinetic energy to the rotational shaft via a gear arrangement.

According to some embodiments, the electric motor is a DC motor. This may be advantageous as it may provide a cost-effective solution compared to other motor alternatives. Moreover, DC motors are readily available in appropriate dimensions and may be easier to control than other motor alternatives.

According to some embodiments, the diverter comprises one or more conveyor belts configured to actively control movement of banknotes being in contact therewith. The use of conveyor belt(s) on the diverter may be advantageous as it allows for actively aiding transport/diverting of the banknotes as they come in contact with the diverter. This may speed up the overall transport process, as transport speed is not lowered during the diverting process. Furthermore, it may improve the reliability of the diverter in controlling direction of the banknotes. For example, it may reduce the risk of paper jam.

According to some embodiments, the one or more conveyor belts extend on a periphery of the diverter between said proximal end and said distal end such that a plane of rotation of the one or more conveyor belts coincides with a plane of rotation of the diverter between said first position and said second position. This implies that a rotational axis of the diverter is parallel with rotational axes of the conveyor belt.

According to some embodiments, the diverter further comprises two or more pullies configured to support the one or more conveyor belts and wherein at least one of the two or more pullies is arranged to transfer kinetic energy to the one or more conveyor belts so as to provide a movement thereof. Typically, for a conveyor belt, two pullies are used, one at the proximal end and the other one at the distal end. However, it is conceivable to use more than two pullies. For example, further pullies may be used between the pulley at the distal end and the pulley at the proximal end to provide support to the conveyor belt in an intermediate region between the proximal and distal ends.

According to some embodiments, the diverter has a recess extending from the distal end towards the proximal end, wherein said recess is configured to allow a banknote guiding element of the banknote handling machine to protrude through the diverter when the diverter is in the second position and wherein the one or more conveyor belts are two conveyor belts arranged parallel to each other on opposite sides of the recess. This may be advantageous as it may allow using the same banknote guiding element on opposite side of the diverter. The guiding element may be e.g. a conveyor belt of the banknote transport arrangement. Such a conveyor belt may be configured to press banknotes towards a further supporting structure, such as a further conveyor belt of the banknote transport arrangement, so as to define the transport path. The use of a recessed diverter may reduce the risk of accidentally diverting the banknotes along the wrong path as the correct transport path is physically defined by the position of the diverter in relation to the banknote guiding element protruding there through.

According to some embodiments, the banknote handling machine further comprises a control unit configured to control rotation of the diverter. The control unit may be further configured to control movement of the one or more conveyor belts. For example, the control unit may be configured to control rotational speed and/or direction of the one or more conveyor belts.

According to some embodiments, banknote handling machine further comprises:
a banknote input/output unit,
a banknote validation unit configured to check the validity of banknotes transported therethrough, and
a banknote storage unit for storing banknotes declared valid by the banknote validation unit,
wherein the first transport path connects the banknote validation unit to the banknote input/output unit for allowing banknotes declared invalid by the banknote validation unit to be output from the machine, and
wherein the second transport path connects the banknote validation unit to the banknote storage unit for allowing banknotes declared valid by the banknote validation unit to be stored in the banknote storage unit.

According to some embodiments, the third transport path connects the banknote validation unit to the banknote input/output unit for allowing banknotes stored in the banknote storage unit to be output from the machine.

It is noted that the inventive concepts relate to all possible combinations of features unless explicitly stated otherwise.

BRIEF DESCRIPTIONS OF THE DRAWINGS

The above, as well as additional objects, features and advantages of the present inventive concept, will be better understood through the following illustrative and non-limiting description, with reference to the appended drawings. In the drawings like reference numerals will be used for like elements unless stated otherwise.

Figure 1:
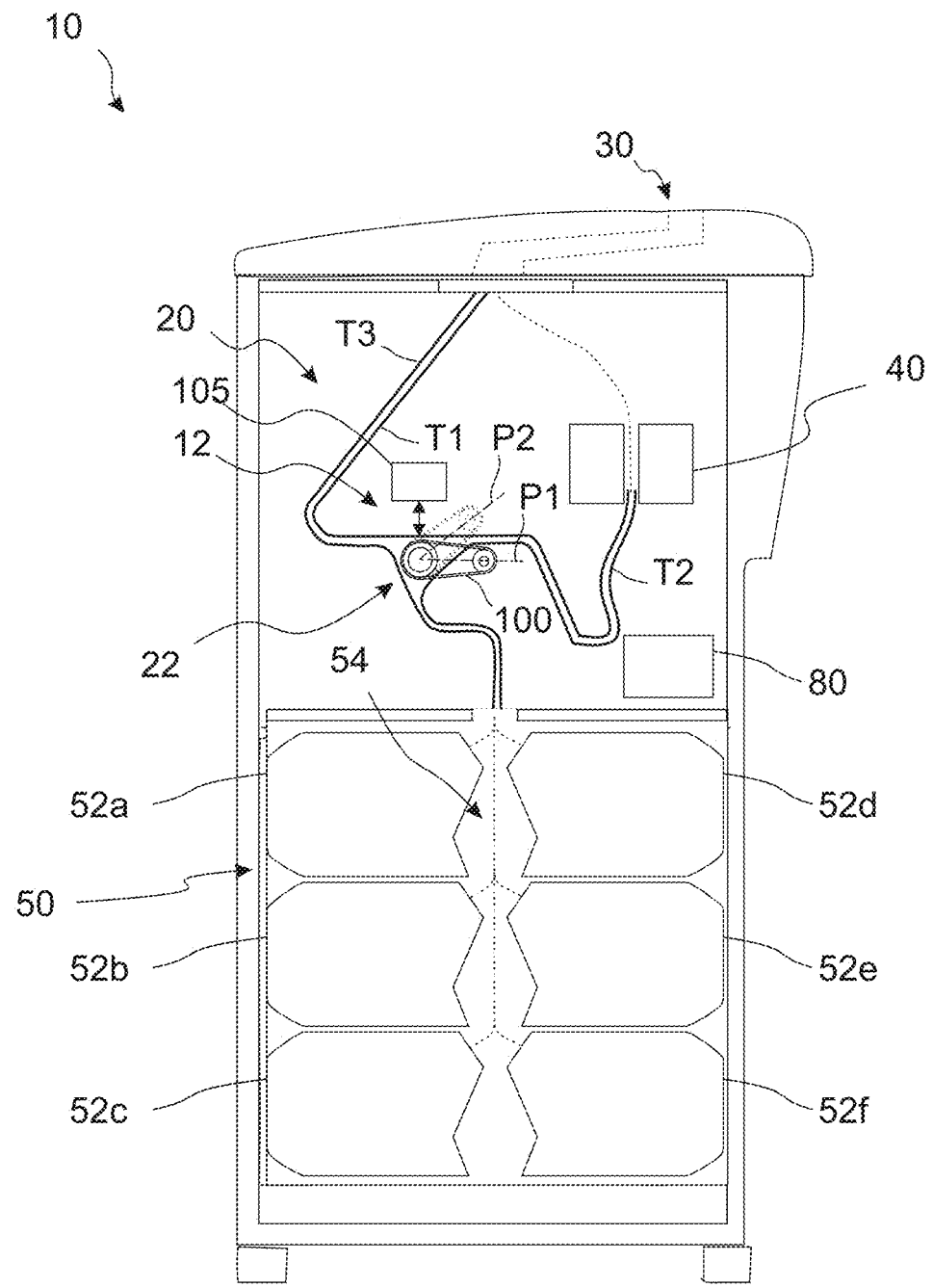
FIG. 1 is a schematic side view of a banknote handling machine according to an embodiment of the present disclosure.
Figure 3A:
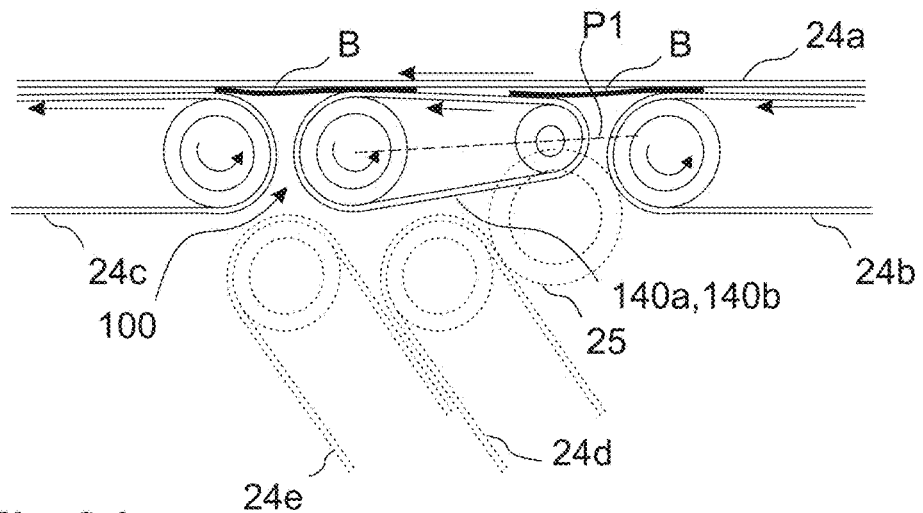
Figure 3B:
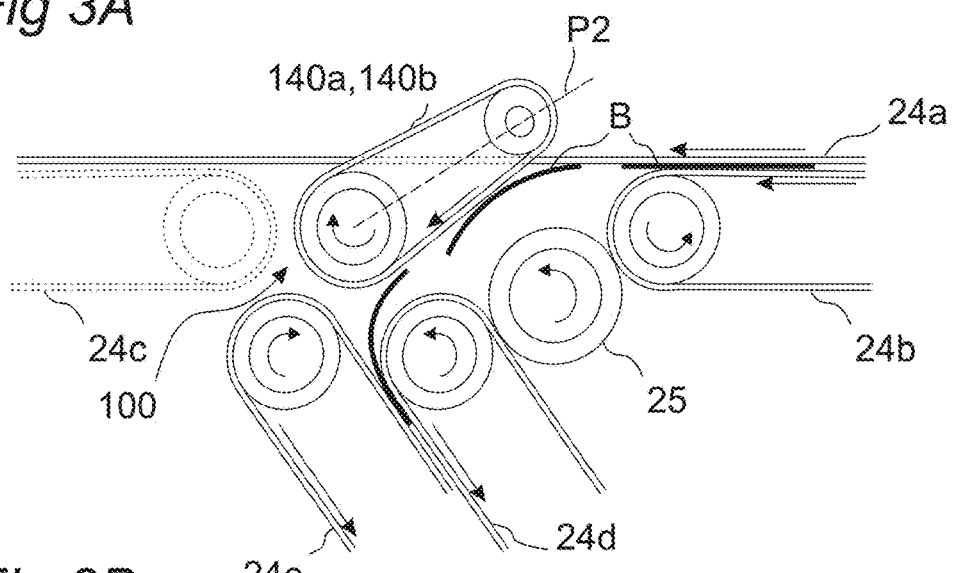
Figure 3C:
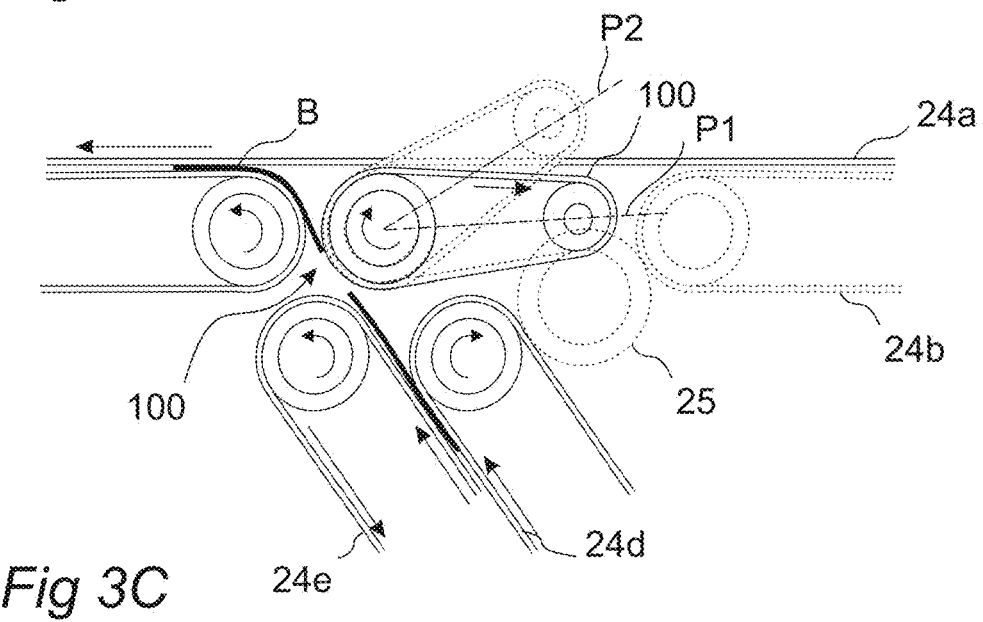

FIG. 3A-C are side views of a transport system of the banknote handling machine of FIG. 1. In FIG. 3A, the banknotes are transported along a first transport direction, In FIG. 3B, the banknotes are transported along a second transport direction, and in FIG. 3C, the banknotes are transported along a third transport direction.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

FIG. 1 shows a banknote handling machine 10 according to an example embodiment. The banknote handling machine 10 is intended to be used at a point of sale (PoS), such as in a store and/or mall, and is thus especially designed and constructed for such cash transactions. However, it is understood that other kinds of banknote handling machines are equally applicable within the scope of the claims.

The banknote handling machine 10 comprises a banknote transport arrangement 20 configured to transport banknotes along transport paths within the machine 10. The banknote transport arrangement 20 comprises a plurality of conveyor belts (not shown) arranged such that at least two conveyor belts of the plurality of conveyor belts clamp each transported banknote to transport them along a direction defined by the conveyor belts. The plurality of conveyor belts is configured to transport banknotes along several transport paths within the machine. Such transport parts may have junctions, i.e. locations where two or more transport paths meet. Specifically, for the example embodiment, three transport paths may be defined, as will be discussed in detail later.

The banknote handling machine 10 further comprises a banknote input/output unit 30 arranged to receive and dispense banknotes from the machine 10. The banknote input/output unit 30 is disposed in an upper portion of the machine 10, which allows for an easy and ergonomical access to the machine 10.

The banknote handling machine 10 further comprises a banknote validation unit 40 configured to check the validity of banknotes transported therethrough. The banknote validation unit 40 may be for example an optical detector, an UV sensor or combination thereof. The banknote validation unit 40 may be configured to validate banknotes for detecting one or more from: legitimate banknotes, counterfeit banknotes, and damaged banknotes. Specifically, a banknote deposited into the input/output unit 30 of the machine 10 will be transported to the banknote validation unit 40 to be validated before any decision is taken on how to handle the banknote. In other words, the banknote validation unit 40 is configured to determine whether banknotes are to be rejected or accepted. The banknote handling machine 10 is configured to redirect rejected banknotes to be output to a user through the banknote input/output unit 30.

The banknote handling machine 10 further comprises a banknote storage unit 50 for storing banknotes declared valid by the banknote validation unit 40. In the example, the banknote storage unit 50 is disposed in a lower portion of the machine 10. The banknote storage unit 50 comprises one or more containers 52a-f configured to store banknotes supplied thereto from the transport arrangement 20. The banknote storage unit 50 is configured to receive banknotes from the banknote handling unit 130 and store banknotes in one or more containers 52a-f of the banknote storage unit 140.

The banknote storage unit 140 is further configured to fetch banknotes from the at least one container 52a-f of the banknote storage unit 140 and provide said banknotes to the transport arrangement 20 to be further transported for dispensing said banknotes to the user. The banknote storage unit 50 comprises a banknote delivery and withdrawal system 54 configured to deliver and withdraw banknotes from the one or more containers 52a-f. The banknote delivery and withdrawal system 54 is further configured to transport said banknote to the transport arrangement 20.

The one or more containers 52a-f constitutes a modular system, which allows for easy removal and/or replacement of individual containers 52a-f. The flexible modular system has several advantages. For example, it allows for easy removal of malfunctioning containers without affecting remaining containers 52a-f. The machine 10 may be configured to allow operation with any number of containers. For example, if a malfunctioning container is removed, and a replacement is not available, the machine may be reconfigured to use the remaining containers only. The machine may control which containers are to receive a specific denomination. The machine may be configured to store different denominations in different containers. Alternatively, the machine may be configured to store a mix of denominations in a specific container. When emptying the machine from banknotes, individual containers may be removed while keeping the stored banknotes inside the individual containers also during transit. This increases safety and speeds up the process of banknote removal. In case the one or more containers 52a-f are configured to store banknotes, the banknotes may be stored in a rolled-up configuration. Alternatively, the banknotes may be stored in a stacked configuration.

As previously mentioned, the banknote transport arrangement 20 is configured to transport banknotes along transport paths within the machine 10. Specifically, for the example embodiment, the banknote transport arrangement 20 is configured to transport banknotes along three unique transport paths within the machine 10, said transport paths being illustrated in FIG. 1. The first transport path T1 connects the banknote validation unit 40 to the banknote input/output unit 30 for allowing banknotes declared invalid by the banknote validation unit 40 to be output from the machine 10. The second transport path T2 connects the banknote validation unit 40 to the banknote storage unit 50 for allowing banknotes declared valid by the banknote validation unit 40 to be stored in the banknote storage unit 50. The third transport path T3 connects the banknote storage unit 50 to the banknote input/output unit 30 for allowing banknotes stored in the banknote storage unit 50 to be output from the machine 10.

The transport of banknotes along the three transport paths are controlled by a diverter 100, the features and functionality of which will be detailed later. Firstly, as illustrated in FIG. 1, the first T1 and second T2 transport path share a common portion, i.e. the portion connecting the banknote validation unit 40 with the diverter 100. Likewise, the second T2 and third T3 transport path share a common portion, i.e. the portion connecting the diverter 100 with the banknote storage unit 50. Finally, the third T3 and the first T1 transport path share a common portion, i.e. the portion connecting the diverter 100 with the banknote input/output unit 30. This implies that the first T1, second T2 and third T3 transport paths together define a three-way junction located at the diverter 100. Each transport path may define transport of banknotes in two opposite directions. Thus, the three-way junction allows for six separate banknote transport directions along three unique transport paths.

Figure 2A:
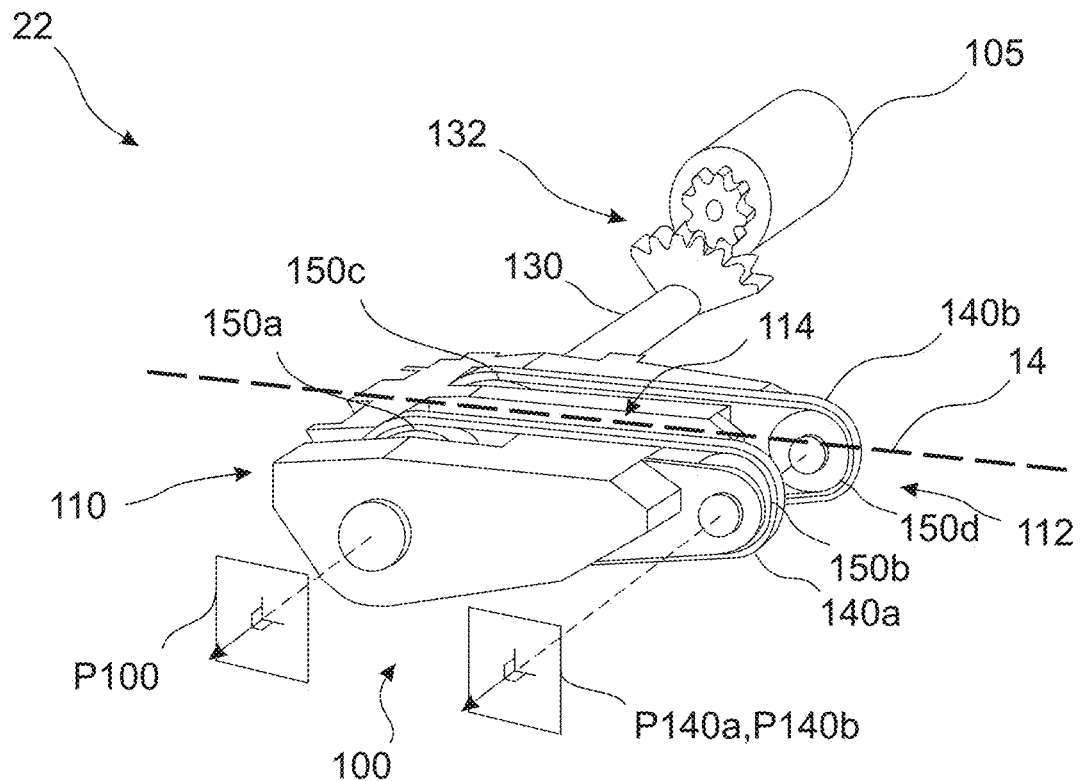
FIG. 2A is a perspective view of a diverter assembly according to an embodiment of the disclosure.

The diverter 100 was briefly mentioned herein in relation to the transport paths. This will be described now in more detail, still with reference to FIG. 1. The banknote transport arrangement 20 comprises a diverter assembly 22. The diverter assembly 22 comprises a diverter 100 rotatably attached to a structure 12 of the machine 10. The diverter assembly 22 further comprises an electric motor 105 (see FIG. 2) configured to transfer kinetic energy to the diverter 100 so as to rotate the diverter 100 between a first position P1 and a second position P2. When being in the first position P1, the diverter 100 is configured to control banknotes to be transported along the first transport path T1, and when being in the second position P2, the diverter 100 is configured to control banknotes to be transported along the second transport path T2. Furthermore, for the example embodiment, when being in the first position P1, the diverter 100 is further configured to control banknotes to be transported along the third transport path T3. In other words, the diverter 100 is responsible for controlling the transport of banknotes within all three transport paths of the banknote transport arrangement 20.

The diverter assembly 22 will now be discussed in more detail with reference to FIG. 2 showing the diverter assembly 22 in an isolated view.

The diverter 100 extends from a proximal end 110 to a distal end 112. The diverter 100 is rotatably attached to the supporting structure 12 at the proximal end 110. The diverter 100 is rotatably attached to the supporting structure 12 via a rotational shaft 130. The supporting structure is not shown in FIG. 2. The supporting structure 12 could be a steel frame, a wall or any other part of the machine 10 adapted for support.

The supporting structure 22 further supports the electric motor 105 which transfers the kinetic energy to the rotational shaft 130 via a gear arrangement 132. The electric motor 105 is a direct current (DC) motor. The banknote handling machine 10 further comprises a control unit 80 configured to control rotation of the diverter 100, e.g. by controlling the electric motor 105.

The diverter 100 comprises one or more conveyor belts 140a, 140b configured to actively control movement of banknotes being in contact therewith. For the example embodiment, the one or more conveyor belts are two conveyor belts 140a, 140b arranged parallel to each other. The one or more conveyor belts 140a, 140b extend on a periphery of the diverter 100 between said proximal end 110 and said distal end 112 such that a plane of rotation P140a, P140b of each conveyor belt coincides with a plane of rotation P100 of the diverter 100 between said first position P1 and said second position P2. The diverter 100 further comprises two or more pullies 150a-d configured to support the one or more conveyor belts 140 and wherein at least one of the two or more pullies 150a, 150b is arranged to transfer kinetic energy to the one or more conveyor belts 140 so as to provide a movement thereof. The one or more conveyor belts 140 are operated by a further electric motor (not shown), which motor can reverse the rotational direction depending on the banknote transport direction. The further electric motor is mounted on the chassis and linked to the conveyor belts 140 by a further gear arrangement (not shown).

Figure 2B:
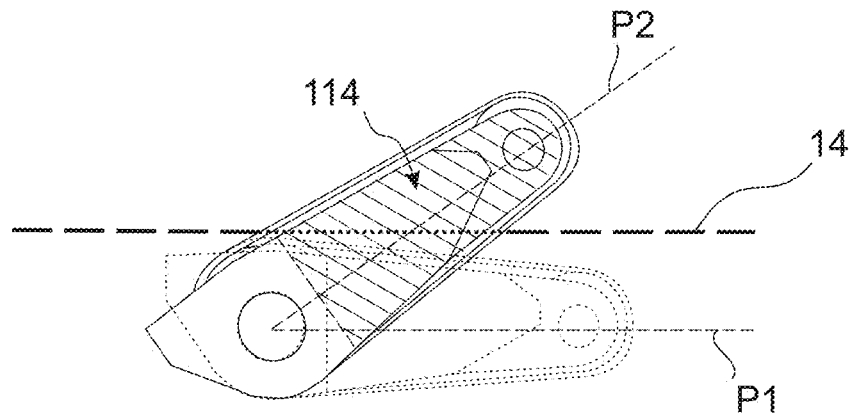
FIG. 2B is a side view of the diverter of FIG. 2A when being in the first position (dotted lines) and second position (solid lines), respectively.

The diverter has a recess 114 extending from the distal end 112 towards the proximal end 110. The recess 114 is configured to allow a banknote guiding element 14 of the banknote handling machine 10 to protrude through the diverter when the diverter is in the second position P2. The banknote guiding element 22 may be e.g. parts of a conveyor belt, or a stationary guide such as a steel plate. The geometry is best illustrated in FIG. 2B, showing the recess 114 marked as a striped area. The two conveyor belts 140a, 140b are arranged on opposite sides of the recess 114. The protruding of the banknote guiding element 14 through the diverter 100 allows for banknotes to be more efficiently and correctly diverted, as will be discussed in detail later.

FIG. 3A-C shows the operation of the banknote transport arrangement 20 according to an example embodiment. The diverter 100 is here shown together with parts of the banknote transport arrangement 20 configured to transport banknotes within the machine.

FIG. 3A shows how banknotes B are transported through the diverter assembly 22 along the first transport path T1 when the banknotes B are transported from the banknote validation unit 40 to the banknote input/output unit 30. The banknotes B are guided and transported by a first conveyor 24a and a second conveyor 24b towards the diverter arrangement 22. Prior to entering the diverter arrangement 22, the banknotes B are clamped, one by one, between the first 24a and second 24b conveyor. The diverter 100 is in the first position P1. As the banknotes B enter the diverter arrangement 22, they are clamped between the one or more conveyors 140a, 140b and the first conveyor 24a, to be further transported through the diverter assembly 22. After having left the diverter assembly 22, the banknotes are picked up by the first 24a and a third conveyor 24c, for further transport of the banknotes L to the input/output unit 30. Here, the second conveyor 24b, the third conveyor 24c and the one or more conveyors of the diverter 140a, 140b each rotate in a counter-clockwise direction.

FIG. 3B shows how banknotes B are transported through the diverter assembly 22 along the second transport path T2 when the banknotes B are transported from the banknote validation unit 40 to the banknote storage unit 50. The banknotes B are guided and transported by the first conveyor 24a and the second conveyor 24b towards the diverter arrangement 22. Prior to entering the diverter arrangement 22, the banknotes B are clamped, one by one, between the first 24a and second 24b conveyor. The diverter 100 is here in the second position P2. This means that the first conveyor 24a, acting here as a banknote guiding element (compare to the banknote guiding element 14 of FIGS. 2A and B) protrudes through the diverter 100. As the banknotes B enter the diverter arrangement 22, they are forced downwards by the one or more conveyors 140a, 140b of the diverter 100. Guiding wheel 25 prevents the banknotes B from accidentally leaving the second transport path T2. After having left the diverter assembly 22, the banknotes are picked up by a fourth 24d and a fifth 24e conveyor, for further transport of the banknotes B to the banknote storage unit 30. Here, the second conveyor 24b and the fourth conveyor 24d each rotate in a counter-clockwise direction, whereas the fifth conveyor 24e and the one or more conveyors 140a, 140b of the diverter 100 each rotate in a clockwise direction.

FIG. 3C shows how banknotes B are transported through the diverter assembly 22 along the third transport path T3 when the banknotes B are transported from the banknote storage unit 50 to the banknote input/output unit 30. Prior to entering the diverter arrangement 22, the banknotes B are clamped, one by one, between the fourth 24d and fifth 24e conveyor. The diverter 100 is here in the first position P1. As the banknotes B enter the diverter arrangement 22, they are guided upwards by the one or more conveyors 140a, 140b of the diverter 100, and the third conveyor 24c. After having left the diverter assembly 22, the banknotes are picked up by the first 24a and a third 24c conveyor, for further transport of the banknotes B to the banknote input/output unit 30. Here, the third conveyor 24c and the fifth conveyor 24e each rotate in a counter-clockwise direction, whereas the fourth conveyor 24d and the one or more conveyors 140a, 140b of the diverter 100 each rotate in a clockwise direction.

The person skilled in the art realizes that the present invention by no means is limited to the preferred embodiments described above. On the contrary, many modifications and variations are possible within the scope of the appended claims. For example, the diverter may be set in more than two different positions for controlling transport of banknotes in plural transport paths.

Additionally, variations to the disclosed embodiments can be understood and effected by the skilled person in practicing the claimed invention, from a study of the drawings, the disclosure, and the appended claims.

The invention claimed is:
1. A banknote handling machine comprising:
   a banknote transport arrangement configured to transport banknotes along transport paths within the machine, wherein the banknote transport arrangement comprises a plurality of conveyor belts arranged such that at least two conveyor belts of the plurality of conveyor belts clamp each banknote transported along said transport paths along a direction defined by the conveyor belts, wherein the banknote transport arrangement comprises
      a diverter assembly comprising:
      a diverter rotatably attached to a structure of the machine, and
      an electric motor configured to transfer kinetic energy to the diverter so as to rotate the diverter between a first position and a second position, wherein the diverter, when in the first position, is configured to control banknotes to be transported along a first transport path, wherein the diverter, when in the second position, is configured to control banknotes to be transported along a second transport path, and wherein the diverter, when in the first position, is further configured to control banknotes to be transported along a third transport path, wherein the first transport path and the second transport path share a first common portion, wherein the second transport path and the third transport path share a second common portion, and wherein the third transport path and the first transport path share a third common portion, such that the first, second and third transport paths together define a three-way junction located at the diverter, and wherein the diverter comprises one or more conveyor belts configured to actively control movement of banknotes being in contact therewith;

wherein the diverter has a recess extending from a distal end towards a proximal end thereof, and said recess is configured to allow a banknote guiding element of the banknote handling machine to protrude through the diverter when the diverter is in the second position and wherein the one or more conveyor belts are two conveyor belts arranged parallel to each other on opposite sides of the recess.

2. The banknote handling machine according to claim 1, wherein the diverter extends from a proximal end to a distal end, the diverter being rotatably attached to a supporting structure at said proximal end.

3. The banknote handling machine according to claim 1, wherein the diverter is rotatably attached to said structure via a rotational shaft.

4. The banknote handling machine according to claim 3, wherein the electric motor transfers the kinetic energy to the rotational shaft via a gear arrangement.

5. The banknote handling machine according to claim 1, wherein the electric motor is a DC motor.

6. The banknote handling machine according to claim 1, wherein the one or more conveyor belts extend on a periphery of the diverter between said proximal end and said distal end such that a plane of rotation of each conveyor belt coincides with a plane of rotation of the diverter between said first position and said second position.

7. The banknote handling machine according to claim 1, wherein the diverter further comprises two or more pulleys configured to support the one or more conveyor belts and wherein at least one of the two or more pulleys is arranged to transfer kinetic energy to the one or more conveyor belts so as to provide a movement thereof.

8. The banknote handling machine according to claim 1, further comprising a control unit configured to control rotation of the diverter.

9. The banknote handling machine according to claim 1, further comprising:
a banknote input/output unit,
a banknote validation unit configured to check the validity of banknotes transported therethrough, and
a banknote storage unit for storing banknotes declared valid by the banknote validation unit,
wherein the first transport path connects the banknote validation unit to the banknote input/output unit for allowing banknotes declared invalid by the banknote validation unit to be output from the machine, and
wherein the second transport path connects the banknote validation unit to the banknote storage unit for allowing banknotes declared valid by the banknote validation unit to be stored in the banknote storage unit, wherein the third transport path connects the banknote storage unit to the banknote input/output unit for allowing banknotes stored in the banknote storage unit to be output from the machine.

* * * * *